(12) United States Patent
Yang

(10) Patent No.: US 8,311,953 B1
(45) Date of Patent: Nov. 13, 2012

(54) ESTIMATING AGGREGATE COSTS USING TOKENS

(75) Inventor: Don Hsi-Yun Yang, Milpitas, CA (US)

(73) Assignee: Google Inc., Mountain View, CA (US)

( * ) Notice: Subject to any disclaimer, the term of this patent is extended or adjusted under 35 U.S.C. 154(b) by 598 days.

(21) Appl. No.: 12/480,339

(22) Filed: Jun. 8, 2009

(51) Int. Cl.
*G06F 17/00* (2006.01)
*G06G 7/00* (2006.01)
*G06Q 10/00* (2012.01)
*G06Q 30/00* (2012.01)

(52) U.S. Cl. ...................... 705/400; 705/7.35
(58) Field of Classification Search ............... 705/7.35, 705/400
See application file for complete search history.

(56) References Cited

U.S. PATENT DOCUMENTS

| | | | |
|---|---|---|---|
| 5,063,506 A | 11/1991 | Brockwell et al. | |
| 5,317,503 A | 5/1994 | Inoue | |
| 2005/0222700 A1* | 10/2005 | Itano | 700/106 |
| 2006/0064393 A1* | 3/2006 | Orr | 705/400 |

OTHER PUBLICATIONS

Bouabaz, Mohamed et al. "A Cost Estimation Model for Repair Bridges Based on Artificial Neural Network" American Journal of Applied Sciences 5(4), year 2008. pp. 334-339.*

Bouabaz, Mohamed and Mounir Hamami. "A Cost Estimation Model for Repair Bridges Based on Artificial Neural Network." Science Publications; 2008. Retrieved from the Internet <URL: http://www.scipub.org/fulltext/ajas/ajas54334-339.pdf>.

* cited by examiner

*Primary Examiner* — John Hayes
*Assistant Examiner* — Allen J Jung
(74) *Attorney, Agent, or Firm* — Fish & Richardson P.C.

(57) ABSTRACT

In general, one aspect of the subject matter described can be embodied in a method that includes receiving a first repair request for a first computer hardware component and receiving a second repair request for a second computer hardware component. The method can further include selecting first numerical tokens to describe the first repair request and selecting second numerical tokens to describe the second repair request, wherein each of the first and second tokens are associated with a different level of a hierarchy of tokens. The method can additionally include, for each level of the hierarchy of tokens, selecting each unique individual token associated with the level of the hierarchy of tokens from the first tokens and from the second tokens. The method can further include determining an aggregate cost of the first request and the second request from the selected unique individual tokens.

20 Claims, 4 Drawing Sheets

ESTIMATING AGGREGATE COSTS USING TOKENS

BACKGROUND

The present disclosure relates to estimating costs associated with performing requested actions.

In management accounting, cost accounting establishes the budget and actual cost of operations, processes, departments or products and the analysis of variances, profitability or use of funds. Managers use cost accounting to support decision-making to cut a company's costs and improve profitability. Cost estimation models are mathematical algorithms or parametric equations typically used to estimate the costs of a product or project. The results of the models are commonly needed to obtain approval to proceed, and are factored into business plans, budgets, and other financial planning and tracking mechanisms.

SUMMARY

This specification describes technologies relating to cost estimation.

In general, one aspect of the subject matter described in this specification can be embodied in a method that includes receiving a first repair request for a first computer hardware component of a first computer and receiving a second repair request for a second computer hardware component of the first computer. The method can further include selecting first numerical tokens to describe the first repair request wherein the first tokens include one or more first pairs of tokens that are related as hardware component and subcomponent and wherein each of the first tokens is associated with a different level of a hierarchy of tokens; and selecting second numerical tokens to describe the second repair request wherein the second tokens include one or more second pairs of tokens that are related as hardware component and subcomponent and wherein each of the second tokens is associated with a different level of the hierarchy of tokens. The method can additionally include, for each level of the hierarchy of tokens, selecting each unique individual token associated with the level of the hierarchy of tokens from a set of individual tokens the include at least a first individual token from the first tokens associated with the level of the hierarchy of tokens and a second individual token from the second tokens associated with the level of the hierarchy of tokens; and determining an aggregate cost of the first request and the second request from the selected unique individual tokens.

These and other embodiments can optionally include one or more of the following features. The first numerical tokens can include three individual tokens and the second numerical tokens comprises three individual tokens and where the set of selected unique individual tokens is comprised of at least one individual token from the first numerical tokens and at least one individual token from the second numerical tokens. The three individual tokens of the first numerical tokens can be associated with a hardware component type for the first computer hardware component, a location of the first computer hardware component within the first computer, and a computer hardware subtype for the first computer hardware component; and the three individual tokens of the second numerical tokens can be associated with a hardware component type for the second computer hardware component, a location of the second computer hardware component within the first computer, and a computer hardware subtype for the second computer hardware component.

The first computer hardware component can be different than the second computer hardware component. The first hardware component can be one of the group consisting of: a hard drive, a hard drive cable, a processor, a heatsink, a fan, a power supply, a power supply cable, random access memory, and a motherboard. The levels of the hierarchy of tokens can be associated with levels of abstraction of hardware components of the first computer. Determining the aggregate cost can include determining a cost associated with each of the selected unique individual tokens. The cost associated with a selected unique individual tokens can correspond to a cost of a hardware component and a cost of labor associated with the individual token. The determined aggregate cost can include a first cost associated with performing the first repair request plus a second cost associated with performing the second repair request minus a third cost associated a portion of the second repair request that is performed as part of the first repair request.

Particular embodiments of the subject matter described in this specification can be implemented to realize one or more of the following advantages. The efficiency and accuracy by which costs can be estimated is increased. Redundant actions are identified by simply comparing the tokens representing the received requests. Additionally, the complexity associated with managing and identifying cost savings associated with performing multiple requests together is decreased. When a new request is added to the system, it is assigned a group of individual tokens from the existing token hierarchy based upon the hardware component associated with the request. There is no comparison between the new request and the existing request and no rules need to be created.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
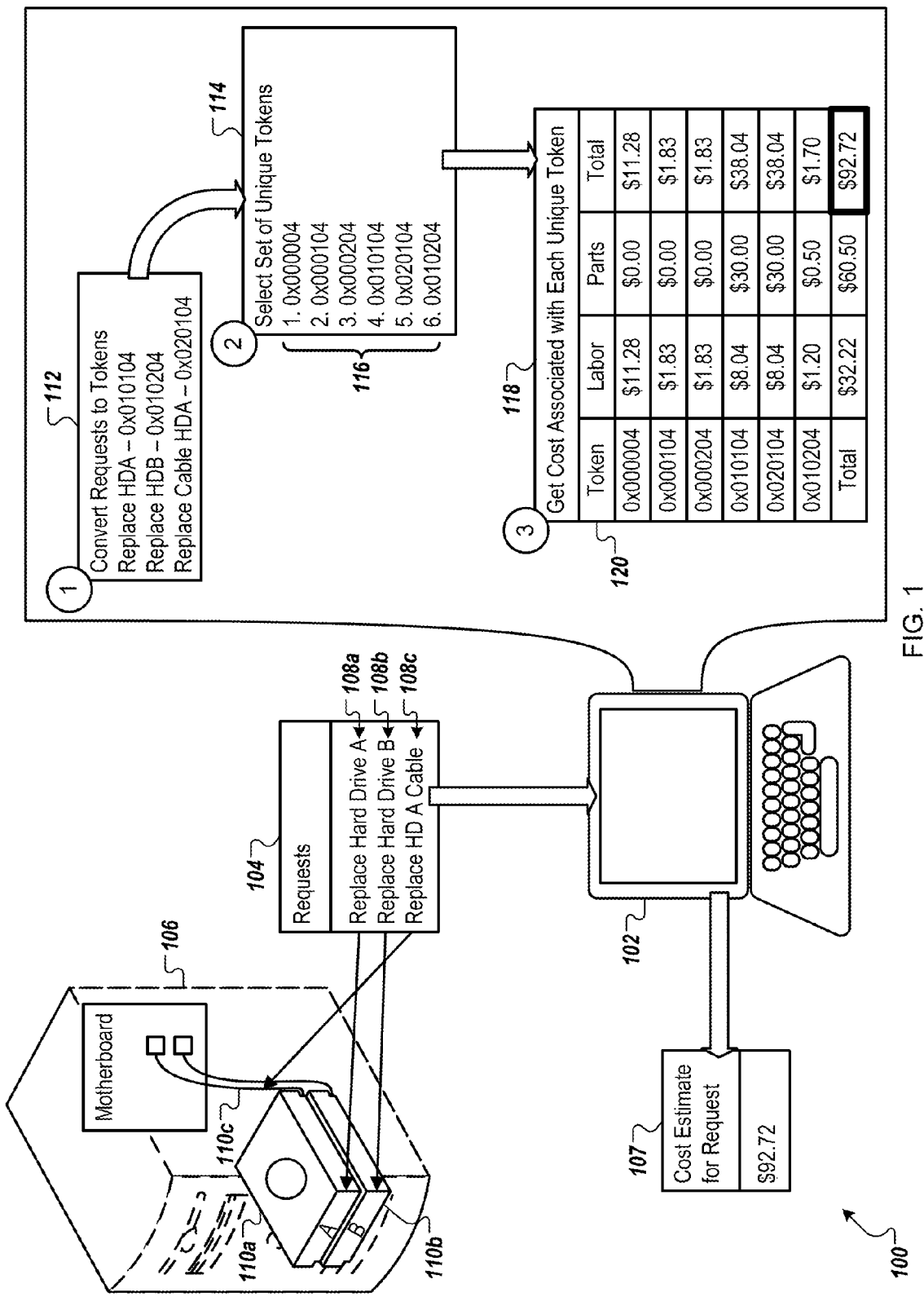
FIG. 1 shows a diagram illustrating an example token-based approach to determining costs associated with repairing a computer system.

FIG. 1 shows a diagram 100 illustrating an example token-based approach to determining costs associated with repairing a computer system. The diagram 100 illustrates a server 102 (e.g., a computing device such as a personal computer, a portable computer, a personal digital assistant, or a mobile phone) that receives requests 104 to repair computer hardware components. Based upon the received requests 104, the server 102 determines an estimated aggregate cost 107 to repair the computer hardware components. The aggregate cost estimate 107 can include the cost of labor (e.g., the cost for a technician to travel to the site and to perform the repairs) and hardware (e.g., the cost of the hardware component being used for the repair or replacement) to fulfill the requests 107.

For example, the server 102 receives three requests 108a-c to repair hardware components in computer 106. The first request 108a is a request to replace hard drive A 110a of computer 106. The second request 108b is a request to replace hard drive B 110b of computer 106. The third request 108c is a request to replace a cable 110c connecting hard drive A 110a to a mother board in computer 106. The server 102 estimates an aggregate cost 107 for performing these three requests 108a-c. For instance, the server 102 can estimate the aggregate cost 107 based on the cost associated with a technician to perform requests 108a-c and the cost of replacement parts for the hard drive A 110a, the hard drive B 110b, and the cable 110c.

The aggregate cost estimate 107 produced by the server 102 accounts for cost savings that are realized by performing related requests 108a-c together. Cost savings can be realized at least when there are overlapping labor actions associated with the requests 108a-c. For instance, there are labor actions associated with each of the requests 108a-c (e.g., technician travels to the computer 106, the technician opens the computer 106, the technician replaces a part in the computer 106 etc.). An overlapping labor action is an action that is performed as part of two or more of the requests 108a-c (e.g., to perform each of the requests 108a-c individually, a technician has to open the computer 106). When there is a labor action associated with the requests 108a-c that overlaps, a cost savings is realized because the overlapping action is performed only once for all of the requests 108a-c instead of once for each of the requests 108a-c. An amount of cost savings realized depends on at least the cost associated with the overlapping action (e.g., a cost for a technician to open the computer 106) and a number of requests over which the action overlaps (e.g., if two requests have an overlapping action, the cost of the action is saved once; if three requests have an overlapping action, the cost of the action is saved twice, etc.).

For example, the cost associated with the request 108a to replace hard drive A 110a can include the labor cost associated with a technician traveling to computer 106, opening computer 106, accessing hard drive A 110a, and replacing hard drive A 110a. The cost associated with the request 108c to replace cable 110c connecting hard drive A 110a to the motherboard can include the labor cost associated with a technician traveling to computer 106, opening computer 106, accessing hard drive A 110a, and replacing cable 110c. The first three labor actions performed for the requests 108a and 108c overlap. When requests 108a and 108c are performed together, a technician will only have to travel to computer 106, open computer 106, and access hard drive A 110a once. By performing requests 108a and 108c together, a cost savings can be realized since the three overlapping actions are performed once instead of twice. These cost savings are accounted for in the aggregate cost estimate 107 by the server 102.

The server 102 uses tokens associated with the requests 108a-c to efficiently estimate the aggregate cost 107 while accounting for cost savings. Each request can be associated with a group of tokens that collectively represent the request. Each individual token can represent a portion of a request, such as a type of action (or a collection of actions) that is performed as part of a request, a position at which an action is performed, or a type of hardware component to which an action is performed. For example, if the request 108a is represented by a group of three individual tokens, then the first token can indicate that the request 108a pertains to an action related a hard drive, the second token can indicate that the request 108a regards hard drive position A 110a specifically, and the third token can indicate the request 108a specifically regards replacing hard drive A 110a.

The individual tokens that represent a request can be part of a hierarchy of tokens. By way of illustration, each of the individual tokens can represent a distinct part of the computer 106 at a different level of abstraction. Using the previous example, the first token is associated with a first level of abstraction where the computer 106 is divided into distinct parts such a hard drive, a processor, a motherboard, a power supply, memory, etc. The second token is associated with a second level of abstraction in which the distinct parts from the first level of abstraction are divided further into distinct parts. For instance, the first level of abstraction corresponding to hard drives can be divided into the distinct parts hard drive A 110a and hard drive B 110b. The third token is associated with a third level of abstraction within which the distinct parts from the second level are divided further. For example, the second level of abstraction corresponding to hard drive A 110a can be divided into the distinct parts the hard drive A 110a itself, the cable 110c attaching to the hard drive A 110a to the motherboard, a power supply cable attaching to hard drive A 110a, etc.

In some implementations, the number of levels of abstraction corresponds to the number of individual tokens used to represent a request. For example, if server 102 uses a token hierarchy having five levels of abstraction, then each of the requests 108a-c will be represented by a group of five individual tokens. The individual tokens are ordered such that the first individual token for each of the requests 108a-c corresponds to the same level of abstraction, the second individual token for each of the requests 108a-c corresponds to the same level of abstraction, etc. The individual tokens representing a request can be ordered in a variety of ways, including from the most general (the most abstract) level of abstraction to the most specific (the least abstract) level of abstraction.

A single request is uniquely represented by its associated group of tokens. However, the individual tokens within a group of tokens can be used in other groups of tokens to uniquely represent other requests (e.g., tokens A and B can uniquely represent request 108a and tokens A and C can uniquely represent request 108b). Two groups of tokens representing two requests share an individual token when there is an associated action that overlaps between the two requests. For two requests sharing an overlapping action (represented by having an individual token in common), the overlapping action can be removed by selecting a set of unique tokens from the groups of tokens associated with the two requests.

For instance, if a first request is received to replace a first hard drive and a second request is received to replace a second hard drive, the first token for both requests can be the same (e.g., refer generally to replacing a hard drive). When a unique set of tokens is determined for these two requests, this first token will only be included in the unique set once. As such, the labor cost associated with the first token (e.g., the time for a worker to travel to and open the machine) will only be counted once and the associated cost savings can be accounted for.

In various implementations and by way of illustration, to efficiently estimate the aggregate cost 107 using tokens, the server 102 performs three steps 112, 114, and 118 with regard to the received requests 108a-c. At the first step 112, the server 102 converts the requests 108a-c into tokens. To perform this conversion, the server 102 can refer to a predetermined mapping of request to tokens.

Tokens can be encoded in a variety of data types, such as integers in some implementations. In the example depicted in diagram 100, tokens are integers that are represented as hexadecimal numbers. As shown at step 112, request 108*a* is converted into the token 0x010104, request 108*b* is converted into the token 0x010204, and request 108*c* is converted into token 0x020104. The individual tokens within these tokens can be represented by distinct bits (e.g., three individual tokens represented by 8 bits each) or they can be represented using overlapping bits (e.g., the bits for an individual token that more specifically represents a request includes the bits representing an individual token that more generally represents the request).

In the example depicted, each of the requests 108*a-c* are represented by three individual tokens having overlapping bits. The first individual token is represented by the right-most 8 bits (e.g., bit mask 0x0000ff), the second individual token is represented by the right-most 16 bits (e.g., bit mask 0x00ffff), and the third individual token is represented by the right-most 24 bits (e.g., bit mask 0xffffff). The individual tokens for the requests 108*a-c* are shown in Table 1 below.

TABLE 1

| Request | Token | First Individual Token (0x0000ff) | Second Individual Token (0x00ffff) | Third Individual Token (0xffffff) |
|---|---|---|---|---|
| Replace Hard Drive A (108a) | 0x010104 | 0x000004 | 0x000104 | 0x010104 |
| Replace Hard Drive B (108b) | 0x010204 | 0x000004 | 0x000204 | 0x010204 |
| Replace Cable for Hard Drive A (108c) | 0x020104 | 0x000004 | 0x000104 | 0x020104 |
| Unique Tokens | | 0x000004 | 0x000104, 0x000204 | 0x010104, 0x010204, 0x020104 |

Depending on the levels of abstraction used to define the hierarchy of tokens for the computer 106, these individual tokens for the requests 108*a-c* shown in Table 1 can represent a variety of things. For instance, using the three levels of abstraction described in a previous example, the first individual token (0x000004) for the requests 108*a-c* indicates that each of the requests 108*a-c* corresponds to a hard drive. The second individual token (0x000104) for requests 108*a* and 108*c* indicates that requests 108*a* and 108*c* relate to hard drive A 110*a*. The second individual token (0x000204) for request 108*b* indicates that request 108*b* relates to hard drive B 110*b*. The third individual tokens (0x010204 and 0x010104) for request 108*a* and 108*b* indicate that requests 108*a* and 108*b* regards replacing hard drive A 110*a* itself and hard drive B 110*b* itself, respectively. The third individual token (0x020104) for request 108*c* indicates that the request 108*c* regards replacing the cable 110*c*.

At the second step 114, the server 102 selects a unique set of individual tokens 116 from the tokens representing requests 108*a-c*. The unique set of individual tokens 116 can be derived by comparing the individual tokens (e.g., bitwise comparison of tokens, inserting the tokens into a set of unique tokens, inserting the tokens into a hash set of tokens, etc.). Since the individual tokens in this example are each represented by an 8-bit number, the server 102 can perform a bitwise comparison of the individual tokens to select the unique set of individual tokens 116.

The unique set of individual tokens 106 representing requests 108*a-c* includes six individual tokens, as depicted in Table 1. There is one unique token (0x000004) associated with the first individual token because each of the requests 108*a-c* corresponds to a hard drive. There are two unique tokens (0x000104 and 0x000204) associated with the second individual token because there is overlap between requests 108*a* and 108*c*. The requests 108*a* and 108*c* both relate to hard drive A 110*a*. However, request 108*b* does not overlap because it corresponds to hard drive B 110*b*, which is a distinct component at the second level of abstraction. There are three unique tokens (0x010104, 0x010204, and 0x020104) associated with the third individual token because there is no overlap among the requests 108*a-c* with regard to the specific action that is performed.

At the third step 118, a cost associated with each of the unique individual tokens 116 for the requests 108*a-c* is obtained. As described previously, this cost associated with an individual token can include the cost of labor and the cost of parts (e.g., hardware components) associated with the individual token. To determine the labor and parts cost, the server 102 can refer to at least some predetermined association between an individual token, the labor to be performed, and the parts to be used.

Example costs associated with the unique individual tokens 116 are shown in chart 120. The costs in chart 120 are provided for illustrative purposes. For the token 0x000004, there is an example labor cost of $11.28 and an example parts cost of $0.00. The actions associated with token 0x000004 can include a technician traveling to the computer 106 and opening the computer 106 so as to expose the hard drive area. The labor cost of $11.28 is the cost associated with the technician performing these actions. Since no new parts are being installed with these actions, there is not an associated parts cost.

For tokens 0x000104 and 0x000204, each has an associated labor cost of $1.83 and a parts cost of $0.00. The actions associated with these two tokens can include a technician accessing hard drive A 110*a* and hard drive B 110*b*, respectively (e.g., accessing hard drive A 110*a* can include removing a housing that surrounds hard drive A 110*a*). The labor cost of $1.83 is the cost associated with the technician performing each of these actions. Since no new parts are being installed with these actions, there is not an associated parts cost. Although these tokens have the same associated cost, they can have different costs. For example, hard drive A may be wedged into a location of computer 106 that requires more time for a technician to access. In such a scenario, the labor costs associated with token 0x000104 (e.g., hard drive A 110*a*) would be greater than those associated with token 0x000204 (e.g., hard drive B 110*b*).

For tokens 0x010104 and 0x010204, each has an associated labor cost of $8.04 and a parts cost of $30.00. The actions associated with these two tokens can include a technician installing replacement hard drives for hard drive A 110*a* and hard drive B 110*b*. The labor cost of $8.04 for each token is the cost of the technician performing each hard drive installation. The part cost of $30.00 for each token is the cost associated with each of the new hard drives that is being installed. In this example, the hard drive A 110*a* and the hard drive B 110*b* are being replaced with hard drives having equivalent cost. As explained in the previous paragraph, the labor cost and part cost for each of these tokens can differ.

For token 0x010204, there is an associated labor cost of $1.20 and a part cost of $0.50. The action associated with this token can include a technician replacing the cable 110*c* that connects hard drive A 110*a* to the motherboard in computer 106. The labor cost of $1.20 is the cost of the technician installing the new cable and the part cost of $0.50 is the cost of the new cable.

Once these costs have been obtained, an estimated cost for the requests 108*a-c* is determined by aggregating all of the costs associated with the unique tokens 116. Since redundant actions contained within the requests 108a-c have been removed through the use of a hierarchy of tokens, the costs associated with the unique tokens 116 can be aggregated without adjustment. In this example, the aggregate cost estimate 107 for the requests 108a-c is $92.72. The server 102 can return or display this value to a requestor that submitted the requests 104.

In some implementations, instead of dropping duplicate tokens for two requests sharing an overlapping action, duplicate tokens are added to a set of tokens used to estimate an aggregate cost for the two requests. In such implementations, a cost associated with the duplicate token can added to the aggregate cost estimate with or without a discount. For instance, as depicted in FIG. 1 and described above with reference to Table 1, each of the three requests 108a-c has an associated token 0x000004. A full cost ($11.28) associated with one of the 0x000004 tokens ($11.28) and a discounted cost (e.g., $1.12) associated with two of the 0x000004 can be added to the cost estimate. The discounted cost (e.g., $1.12) can represent a variety of additional costs not included in the full cost ($11.28), such as a technician having to travel to different locations to retrieve each of the associated parts.

Figure 2:
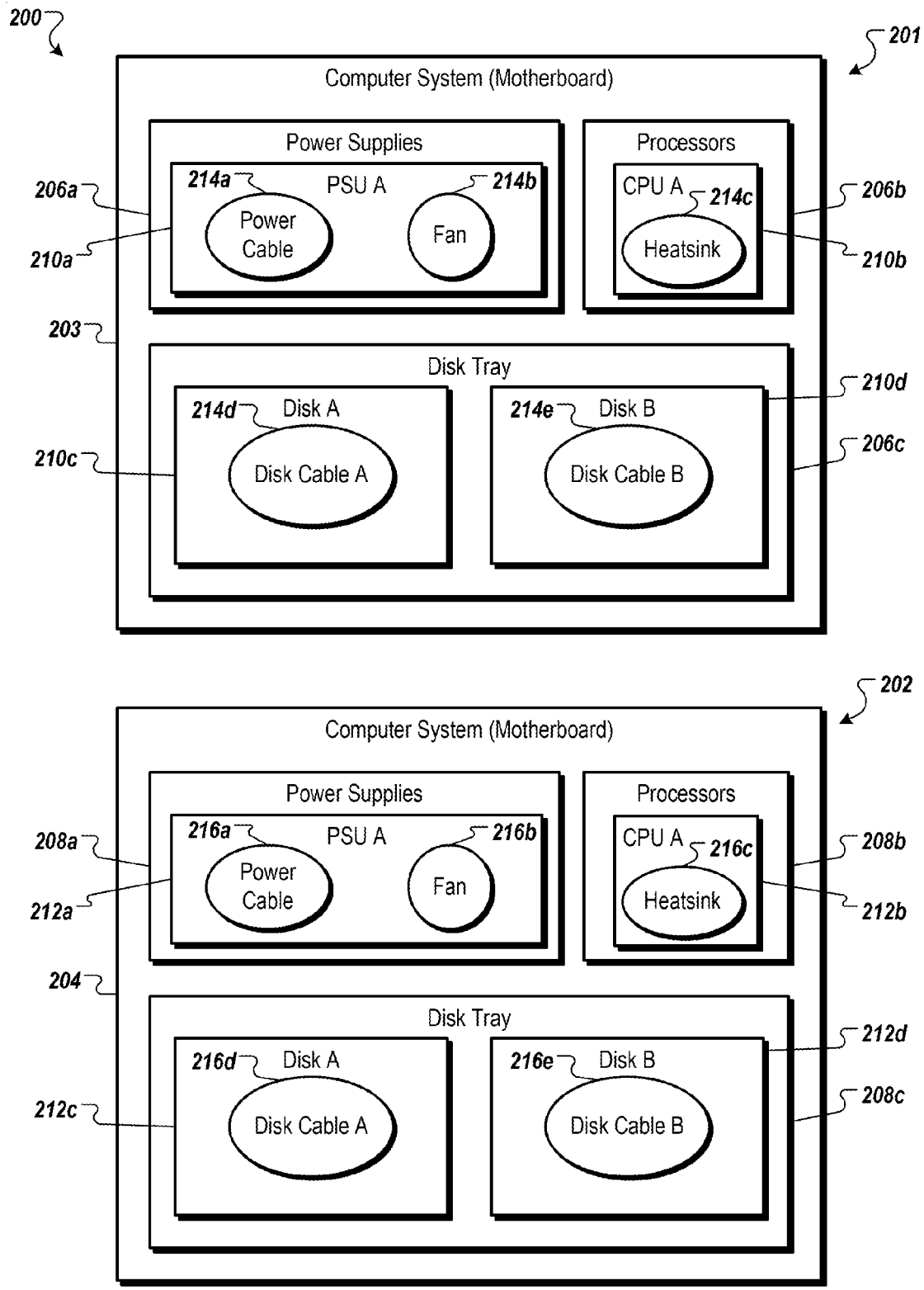
FIG. 2 shows an diagram illustrating an example hierarchy of tokens used to represent two computer systems.

FIG. 2 shows an example diagram 200 illustrating a hierarchy of tokens used to represent two computer systems 201 and 202. As described above with regard to FIG. 1, a hierarchy of tokens represents distinct parts within a computer system at different levels of abstraction. The example hierarchy of tokens depicted in diagram 200 present four different levels of abstraction.

A first level of abstraction corresponds to the computer systems 201 and 202 themselves. In this example, each computer system is defined by a motherboard. Motherboard 203 corresponds to computer system 201 and motherboard 204 corresponds to computer system 202. For example, a housing that contains two motherboards would be defined as containing two computer systems. For this hierarchy of tokens, a received request to repair a computer hardware component (e.g., requests 108a-c) will have a first token corresponding to the first level of abstraction. For example, token 0x00000001 can represent the computer system 201 and the token 0x00000002 can represent the computer system 202.

A second level of abstraction corresponds to distinct parts (e.g., processor, power supply, motherboard, disk drives, etc.) of the computer systems 201 and 202. For this example second level of abstraction, the distinct parts include the motherboard 203, power supplies 206a, processors 206b, and disk tray 206c for computer system 201, and the motherboard 204, power supplies 208a, processors 208b, and disk tray 208c for computer system 202. For this hierarchy of tokens, a received request to repair a computer hardware component (e.g., requests 108a-c) will have a second token corresponding to the second level of abstraction. Example tokens corresponding to the computer parts 206a-c and 208a-c at the second level of abstraction are shown in Table 2 below.

TABLE 2

| Computer Part | Token |
| --- | --- |
| Motherboard 203 | 0x00000101 |
| Power supplies 206a | 0x00000201 |
| Processors 206b | 0x00000301 |
| Disk tray 206c | 0x00000401 |
| Motherboard 204 | 0x00000102 |
| Power supplies 208a | 0x00000202 |

TABLE 2-continued

| Computer Part | Token |
| --- | --- |
| Processors 208b | 0x00000302 |
| Disk tray 208c | 0x00000402 |

The third level of abstraction corresponds to specific instances of the distinct parts identified in the second level of abstraction (e.g., hard drive A 110a and hard drive B 110b). For this example third level of abstraction, specific instances of the distinct parts include the motherboard 203 itself, the power supply unit (PSU) A 210a, the central processing unit (CPU) A 210b, a disk A 210c contained within the disk tray 206c, and a disk B 210d contained within the disk tray 206c for the computer system 201. The third level of abstractions additionally corresponds to the motherboard 204 itself, the PSU A 212a, the CPU A 212b, a disk A 212c contained within the disk tray 208c, and a disk B 212d contained within the disk tray 208c for the computer system 202. For this hierarchy of tokens, a received request to repair a computer hardware component (e.g., requests 108a-c) will have a third token corresponding to the third level of abstraction. Example tokens corresponding to the computer parts at the third level of abstraction are shown in Table 3 below.

TABLE 3

| Computer Part | Token |
| --- | --- |
| Motherboard 203 | 0x00010101 |
| PSU A 210a | 0x00010201 |
| CPU A 210b | 0x00010301 |
| Disk A 210c | 0x00010401 |
| Disk B 210d | 0x00020401 |
| Motherboard 204 | 0x00010102 |
| PSU A 212a | 0x00010202 |
| CPU A 212b | 0x00010302 |
| Disk A 212c | 0x00010402 |
| Disk B 212d | 0x00020402 |

The fourth level of abstraction corresponds to distinct hardware components attached to (or including) the specific instances of distinct hardware parts identified in the third level of abstraction (e.g., cable 110c attached to hard drive A 110a). In this example hierarchy, the fourth level of abstraction specifically identifies the hardware component to which a received request refers. In this example fourth level of abstraction, the distinct hardware components include the motherboard 203 itself, the PSU A 210a itself, power cable 214a attached to PSU A 210a, fan 214b attached to PSU A 210a, the CPU A 210b itself, heatsink 214c attached to CPU A 210b, disk A 210c itself, disk cable A 214d attached to the disk A 210c, disk B 210d itself, and disk cable B 214e attached to disk B 210d. The third level of abstractions additionally corresponds to the motherboard 204 itself, the PSU A 212a itself, power cable 216a attached to PSU A 212a, fan 216b attached to PSU A 212a, the CPU A 212b itself, heatsink 216c attached to CPU A 212b, disk A 212c itself, disk cable A 216d attached to the disk A 212c, disk B 212d itself, and disk cable B 216e attached to disk B 212d. For this hierarchy of tokens, a received request to repair a computer hardware component (e.g., requests 108a-c) will have a fourth token corresponding to the fourth level of abstraction. Example tokens corresponding to the computer parts at the fourth level of abstraction are shown in Table 4 below.

TABLE 4

| Computer Part | Token |
|---|---|
| motherboard 203 | 0x01010101 |
| PSU A 210a | 0x01010201 |
| Power cable 214a | 0x02010201 |
| Fan 214b | 0x03010201 |
| CPU A 210b | 0x01010301 |
| Heatsink 214c | 0x02010301 |
| Disk A 210c | 0x01010401 |
| Disk cable A 214d | 0x02010401 |
| Disk B 210d | 0x01020401 |
| Disk cable B 214e | 0x02020401 |
| motherboard 203 | 0x01010102 |
| PSU A 210a | 0x01010202 |
| Power cable 214a | 0x02010202 |
| Fan 214b | 0x03010202 |
| CPU A 210b | 0x01010302 |
| Heatsink 214c | 0x02010302 |
| Disk A 210c | 0x01010402 |
| Disk cable A 214d | 0x02010402 |
| Disk B 210d | 0x01020402 |
| Disk cable B 214e | 0x02020402 |

Although the hierarchy of tokens described above with reference to FIG. 2 includes four levels of abstraction, any number of levels (e.g., 2, 3, 5, 6, 7, 8, etc.) can be used. For example, a three level hierarchy that does not account for the computer system (the first level of abstraction) could be used. The number of levels of abstraction can be based on the number of distinct hardware components within a computer system and the grouping of those components. For example, a computer system that has two separate disk trays (e.g., disk tray 206c) each containing two hard drives (e.g., disk A 214d and disk B 214e) may require an additional level of abstraction over the levels of abstraction described above.

The computer systems 201 and 202 described above can be any variety of computing device, such as a rack-mounted server, a desktop machine, a laptop, a mobile device (e.g., a PDA, a cell phone, etc.), a printer device (e.g., a printer, a scanner, a copier, etc.) and a networking device (e.g., a switch, a wireless router). Although computer systems 201 and 202 are presented as having the same components, the hardware components as well the hierarchy representing the components of computing devices can vary.

Figure 3:
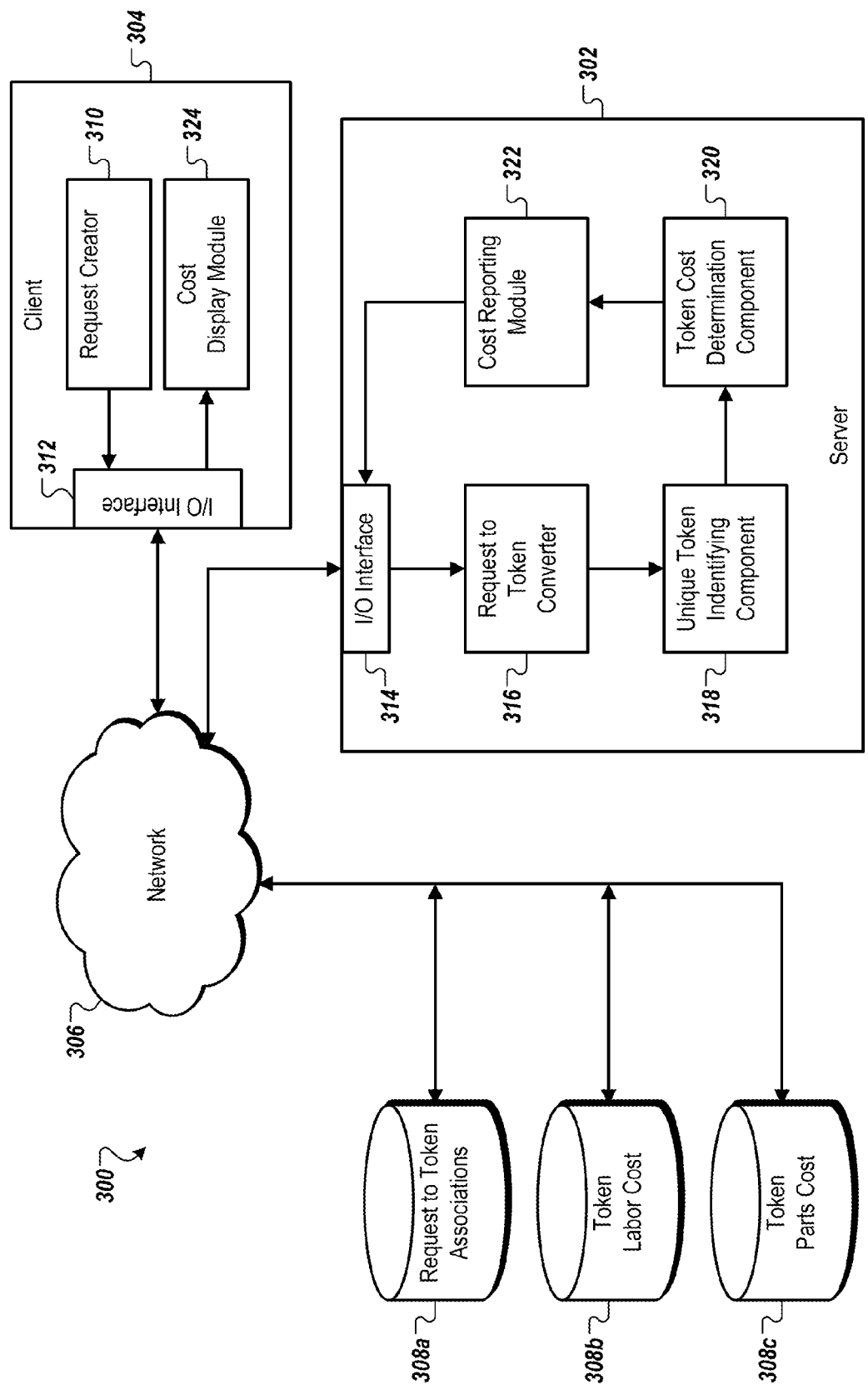
FIG. 3 shows an example system for estimating a cost for a group of requests using a hierarchy of tokens.

FIG. 3 shows an example system 300 for estimating a cost for a group of requests using a hierarchy of tokens. The system 300 is an example of a system in which the techniques described below can be implemented. Although several components are illustrated, there can be fewer or more components in the system 300. Moreover, the components can be distributed on one or more computing devices connected by one or more networks or other suitable communication mediums.

The computer system 300 includes a server 302, a client 304, a network that enables communication between the client 304 in the server 302, and a collection of databases 308a-c. The client 304 generates request to repair computer hardware component and sends the requests to the server 302 over the network 306. The server 302 estimates an aggregate cost for the received requests using the databases 308a-c and returns the cost estimate to the client 304.

The client 304 includes a request creator 310 which generates requests to repair computer hardware components. In some implementations, the request creator 310 receives input from a user that indicates, at least in part, that a computer hardware component should be repaired. In some implementations, the request creator 310 autonomously generates requests. For example, a computer in need of a repair, such as computer 106, sends a message to the client 304 indicating that one of its components is in need of repair. In response, request creator 310 generates a request to send to the server 302 autonomously.

Once the request creator 310 has generated a request, the request creator 310 sends the created request to an input/output (I/O) interface 312 included in the client 304. The I/O interface 312 sends a request generated by the request creator 310 through the network 306 to the client 302. The network 306 can be in a variety of networks that enable communication between the client 304 and the server 302, such as such as the Internet, a subnet, a LAN, or a wireless network.

The server 302 includes an I/O interface 314, a request to token converter 316, a unique token identifying component 318, a token cost determination component 320, and a cost reporting module 322. The server 302 receives a request from the client 304 at an I/O interface 314. The I/O interface 314 provides received requests to the request to token converter 316. The requested to token converter 316 converts received requests into an associated group of individual tokens, similar to the conversions described above with reference to FIGS. 1 and 2. To perform such a conversion, the requested token converter 316 uses a request to token associations database 308a. The request to token associations database 308a stores associations between requests and tokens, such as the associations described above with reference to FIGS. 1 and 2.

For example, an association between request 108a regarding hard drive A 110a and token 0x010104 can be stored in the request to token associations database 308. The request to token associations database 308a can be populated with predetermined associations that are based upon a hierarchy of tokens, such as the hierarchy of tokens described above with reference to FIG. 2. Associations can be selected such that requests having related actions will have overlapping individual tokens.

Once a request has been converted to tokens by the requested token converter 316, the token can be sent to the unique token identifying component 318. The unique token identifying component 318 can identify the unique tokens. The unique individual tokens that are identified can represent a set of actions (with overlapping actions removed) to be performed for multiple requests. The unique token identifying component 318 can identify a set of unique tokens in a variety of ways, such as performing a bitwise comparison of the individual tokens that represent the multiple requests.

Once the unique individual tokens are identified by the unique token identifying component 318, the token cost determination component 320 determines an aggregate cost for the unique individual tokens. The token cost determination component 320 can employ the assistance of a token labor cost database 308b and a token parts cost database 308c. The token labor cost database 308b can store a variety of information associated with labor costs for a given token. The token labor cost database 308b can include information such as an amount of time estimated to perform the actions associated with a token, hourly wage rates for technicians that to perform the associated actions, and a physical location for the technicians. An estimated time for a repair associated with a token can be based upon an actual amount of time the repair took previously. Using this information, the token cost determination component 320 can determine an estimated labor cost associated the unique individual tokens.

For example, if a token has an estimated time of 15 minutes (0.25 hours), the technician assigned to perform the task has an hourly wage of $20/hour, and the technician is located 6 minutes (0.1 hours) away from the repair site, then the token cost determination component 320 can determine the estimated cost for the token to be $7.00 ($20/hour*0.25 hours+ $20/hour*0.1 hours=$7.00).

The token cost determination component 320 also uses the token parts cost database 308*b*. The token parts cost database 308*b* provides a cost for computer hardware components associated with tokens. For instance, an individual token that is associated with the action of installing a new hard drive can be associated with the cost of the new hard drive. The token parts cost database 308*b* stores the associated cost of the new hard drive.

Additionally, the token cost determination component 320 can use additional input beyond the databases 308*b*-*c* to determine the cost associated with tokens. The token cost determination component 320 can use additional parameters, such as an age and a warranty associated with the part as well as a platform type for a part (e.g., parts for some vendor platforms are more expensive than other vendor platforms). For example, if a part to be replaced is still within its warranty, the parts cost can be reduced to the cost of submitting the part for warranty replacement. However, if the part has extended beyond its warranty, an associated cost for the part is a full replacement part.

Once the token cost determination component 320 has aggregated the labor and parts cost associated with the unique individual tokens identified by the unit token identifying component 318, the aggregate estimated cost is forwarded to the cost reporting module 322. The cost reporting module 322 transmits the estimated aggregate cost to the client 304 using the I/O interface 314. The client 304 receives the estimated aggregate cost from the server 302 via the I/O interface 312 and displays the cost using a cost display module 324.

Figure 4:
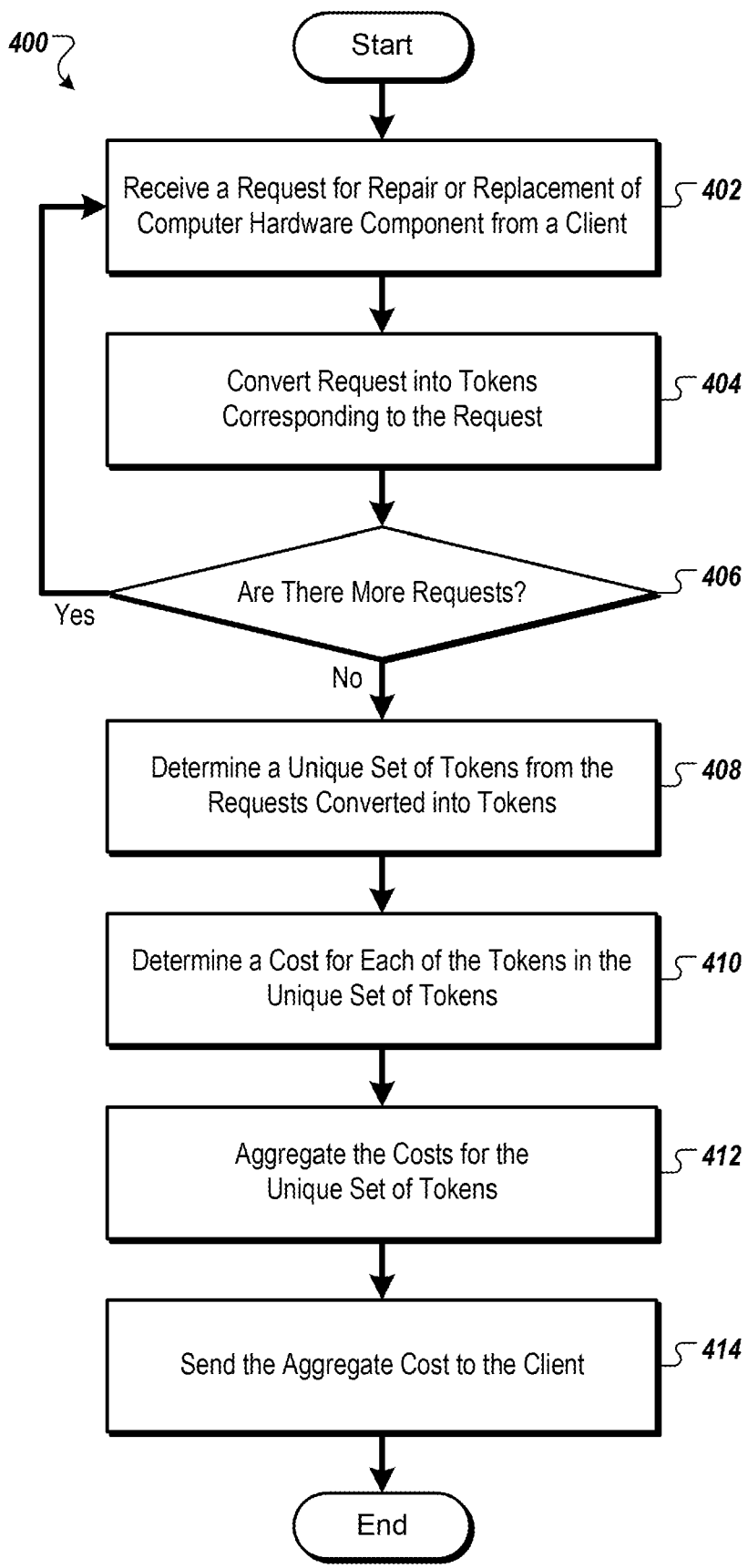
FIG. 4 is a flow chart describing an example technique for estimating an aggregate cost for a group of received requests.

FIG. 4 is a flow chart describing an example technique 400 for estimating an aggregate cost for a group of received requests. The technique 400 can be performed by a variety of systems, for example, by the server system 302, as described with reference to FIG. 3.

The technique 400 begins at step 402 by receiving a request for repair or replacement of a computer hardware component from a client. The received request is converted into tokens corresponding to the request (step 404). The token representing the request can be based upon a hierarchy of tokens, as described above with reference to FIGS. 1 and 2. The token for the received request can be predetermined and stored in a data repository, such as the request to token associations database 308*a*.

If there are more requests to convert into tokens (step 406), then step 402 is repeated for the additional requests. If there are no more requests to convert into tokens (step 406), then a unique set of tokens is determined from the requests converted into tokens (step 408). As described above with reference to FIGS. 1 and 3, the unique tokens can be identified efficiently by doing a bitwise comparison of the tokens.

With the unique set of tokens identified, a cost for each of the tokens in the unique set of tokens is determined (step 410). The costs for each token can include a cost for labor and a cost for parts used to perform an action associated with the token. As described above with reference to FIG. 3, data repositories storing associated labor and parts costs, such as the token labor cost database 308*b* and the token parts cost database 308*c*, can be employed. The costs for the unique set of tokens can be aggregated to provide an estimated aggregate cost for performing the received requests (step 412). This estimated aggregate cost can account for overlapping actions associated with the received requests, as explained above with reference to FIG. 1. The aggregate estimated cost is sent to the client (step 414).

Additional implementations of the description above are possible. The token-based cost estimation described above can additionally apply to requests to repair or replace components in other, non-computer systems. For example, the token-based cost estimation described above can be used to estimate costs associated with other electrical or mechanical systems that include multiple components.

A variety of hierarchies can be used for the token-based cost estimation described above. In some implementations, the hierarchy is based on the actions that are performed as part of a request. For example, with regard to the request 108*a*, in such implementations the first individual token 0x000004 represents a general action for the request 108*a* (e.g., opening the computer 106), the second individual token 0x000104 represents a more specific action (e.g., accessing a part of the computer 106 where hard drives are located), and the third individual token 0x010104 represents a specific action (e.g., replacing hard drive A 110*a*).

In further implementations, the hierarchy is based on hardware components within the computer 106. For instance, with regard to the request 108*a*, in such implementations the first individual token 0x000004 represents a general computer hardware component type for the request 108*a* (e.g., a hard drive), the second individual token 0x000104 specifies to which hard drive the request 108*a* corresponds (e.g., hard drive A), and the third individual token 0x010104 represents the components associated with hard drive A (e.g., hard drive A itself, a cable connecting hard drive A to a power supply, etc.) to which the request 108*a* corresponds.

In additional implementations, the hierarchy is based on factors related to testing or replacement of computer hardware components. Such a hierarchy can be based on actions and costs associated with testing and submitting parts for warranty (e.g., using a returned materials authorization (RMA) process). For instance, with regard to the request 108*a*, the first individual token 0x000004 represents an RMA cost (e.g., testing a part, executing a warranty procedure for a part, etc.) associated with replacing any disk (e.g., a hard drive), the second individual token 0x000104 represents an RMA cost for replacing an old disk (e.g., a disk that is no longer covered by a warranty), and the third individual token 0x010104 represents a cost for replacing a disk that is tested to be bad or unusable (as opposed to a disk that can be reused or recycled). Such a hierarchy can be used in alone or in concert with the other hierarchy implementations, discussed above, for estimating an aggregate cost associated with a group of requests.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily associated with a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
receiving, at a computer system that includes a computer processor, a first repair request for a first computer hardware component of a first computer;
receiving a second repair request for a second computer hardware component of the first computer;
selecting, by the computer system, first numerical tokens that describe the first repair request wherein the first tokens include one or more first pairs of tokens that are related as hardware component and subcomponent and wherein each of the first tokens is associated with a different level of a hierarchy of tokens;

selecting second numerical tokens that describe the second repair request wherein the second tokens include one or more second pairs of tokens that are related as hardware component and subcomponent and wherein each of the second tokens is associated with a different level of the hierarchy of tokens;

for each level of the hierarchy of tokens, selecting each unique individual token from the first tokens and the second tokens, wherein selection of the unique individual tokens causes one or more redundant tokens from the first tokens and the second tokens to not be included in the selected unique individual tokens; and determining, by the computer system, an aggregate cost of the first request and the second request from the selected unique individual tokens.

2. The method of claim 1, where the first numerical tokens comprises three individual tokens and the second numerical tokens comprises three individual tokens and where the of selected unique individual tokens are comprised of at least one individual token from the first numerical tokens and at least one individual token from the second numerical tokens.

3. The method of claim 2, where the three individual tokens of the first numerical tokens are associated with a hardware component type for the first computer hardware component, a location of the first computer hardware component within the first computer, and a computer hardware subtype for the first computer hardware component; and where the three individual tokens of the second numerical tokens are associated with a hardware component type for the second computer hardware component, a location of the second computer hardware component within the first computer, and a computer hardware subtype for the second computer hardware component.

4. The method of claim 1, where the first computer hardware component is different than the second computer hardware component.

5. The method of claim 1, where the first hardware component is one of the group consisting of: a hard drive, a hard drive cable, a processor, a heatsink, a fan, a power supply, a power supply cable, random access memory, and a motherboard.

6. The method of claim 1, where the levels of the hierarchy of tokens are associated with levels of abstraction of hardware components of the first computer.

7. The method of claim 1, where determining the aggregate cost comprises determining a cost associated with each of the selected unique individual tokens.

8. The method of claim 7, where the cost associated with a selected unique individual tokens corresponds to a cost of a hardware component and a cost of labor associated with the individual token.

9. The method of claim 1, where the determined aggregate cost comprises a first cost associated with performing the first repair request plus a second cost associated with performing the second repair request minus a third cost associated a portion of the second repair request that is performed as part of the first repair request.

10. A computer program product, the computer program product tangibly encoded on a non-transitory computer-readable medium, operable to cause data processing apparatus to perform operations comprising:

receiving a first repair request for a first computer hardware component of a first computer;

receiving a second repair request for a second computer hardware component of the first computer;

selecting first numerical tokens that describe the first repair request wherein the first tokens include one or more first pairs of tokens that are related as hardware component and subcomponent and wherein each of the first tokens is associated with a different level of a hierarchy of tokens;

selecting second numerical tokens that describe the second repair request wherein the second tokens include one or more second pairs of tokens that are related as hardware component and subcomponent and wherein each of the second tokens is associated with a different level of the hierarchy of tokens;

for each level of the hierarchy of tokens, selecting each unique individual token from the first tokens and the second tokens, wherein selection of the unique individual tokens causes one or more redundant tokens from the first tokens and the second tokens to not be included in the selected unique individual tokens; and determining an aggregate cost of the first request and the second request from the selected unique individual tokens.

11. The computer program product of claim 10, where the first numerical tokens comprises three individual tokens and the second numerical tokens comprises three individual tokens and where the of selected unique individual tokens are comprised of at least one individual token from the first numerical tokens and at least one individual token from the second numerical tokens.

12. The computer program product of claim 11, where the three individual tokens of the first numerical tokens associated with a hardware component type for the first computer hardware component, a location of the first computer hardware component within the first computer, and a computer hardware subtype for the first computer hardware component; and where the three individual tokens of the second numerical tokens associated with a hardware component type for the second computer hardware component, a location of the second computer hardware component within the first computer, and a computer hardware subtype for the second computer hardware component.

13. The computer program product of claim 12, where the levels of the hierarchy of tokens associated with levels of abstraction of hardware components of the first computer.

14. The computer program product of claim 12, where determining the aggregate cost comprises determining a cost associated with each of the selected unique individual tokens.

15. The computer program product of claim 14, where the cost associated with a selected unique individual tokens corresponds to a cost of a hardware component and a cost of labor associated with the individual token.

16. A system comprising:

a computer readable medium including a program product; and one or more processors configured to execute the program product and perform operations comprising:

receiving a first repair request for a first computer hardware component of a first computer;

receiving a second repair request for a second computer hardware component of the first computer;

selecting first numerical tokens that describe the first repair request wherein the first tokens include one or more first pairs of tokens that are related as hardware component and subcomponent and wherein each of the first tokens is associated with a different level of a hierarchy of tokens;

selecting second numerical tokens that describe the second repair request wherein the second tokens include one or more second pairs of tokens that are related as hardware component and subcomponent and wherein each of the second tokens is associated with a different level of the hierarchy of tokens;

for each level of the hierarchy of tokens, selecting each unique individual token from the first tokens and the second tokens, wherein selection of the unique individual tokens causes one or more redundant tokens from the first tokens and the second tokens to not be included in the selected unique individual tokens; and determining an aggregate cost of the first request and the second request from the selected unique individual tokens.

17. The system of claim 16, where the first numerical tokens comprises three individual tokens and the second numerical tokens comprises three individual tokens and where the of selected unique individual tokens are comprised of at least one individual token from the first numerical tokens and at least one individual token from the second numerical tokens.

18. The system of claim 17, where the three individual tokens of the first numerical tokens are associated with a hardware component type for the first computer hardware component, a location of the first computer hardware component within the first computer, and a computer hardware subtype for the first computer hardware component; and where the three individual tokens of the second numerical tokens are associated with a hardware component type for the second computer hardware component, a location of the second computer hardware component within the first computer, and a computer hardware subtype for the second computer hardware component.

19. The system of claim 16, where the levels of the hierarchy of tokens are associated with levels of abstraction of hardware components of the first computer.

20. The system of claim 16, where the first computer hardware component is different than the second computer hardware component.

\* \* \* \* \*

UNITED STATES PATENT AND TRADEMARK OFFICE
CERTIFICATE OF CORRECTION

PATENT NO. : 8,311,953 B1
APPLICATION NO. : 12/480339
DATED : November 13, 2012
INVENTOR(S) : Don Hsi-Yun Yang It is certified that error appears in the above-identified patent and that said Letters Patent is hereby corrected as shown below:

In the Claims:

Column 15, line 18, in Claim 2, after "where the" delete "of".

Column 16, line 22, in Claim 11, after "where the" delete "of".

Column 17, line 14, in Claim 17, after "where the" delete "of".

Signed and Sealed this
Twenty-eighth Day of May, 2013

Teresa Stanek Rea
*Acting Director of the United States Patent and Trademark Office*